Patented Dec. 5, 1944

2,364,562

UNITED STATES PATENT OFFICE 2,364,562

PREPARATION OF CATALYSTS

Vernon Monroe Stowe, Petersburg, Va., assignor to The Solvay Process Company, New York, N. Y., a corporation of New York No Drawing. Application December 29, 1938, Serial No. 248,308

4 Claims. (Cl. 252—236)

This invention relates to a process for preparing catalysts. More particularly, this invention relates to preparation of catalysts for use in the production of hydrogen by the reaction of carbon monoxide and steam.

In Crittenden application Serial No. 412,927, filed December 9, 1929, issued April 16, 1940, as United States Letters Patent No. 2,197,707, there is described a catalyst adapted for use in the carbon monoxide-steam reaction which may be manufactured by mixing iron oxide and magnesium oxide, moistening the mixture with an aqueous solution containing potassium dichromate, granulating the mixture, drying, and tabletting. The catalyst of this application has been found to be a marked improvement over other catalysts theretofore used in the carbon monoxide-steam reaction. It will be noted catalysts manufactured in accordance with this method contain one gram atom of alkali metal, e. g. potassium, per gram atom of chromium.

It is an object of this invention to prepare catalysts of extremely high activity in the carbon monoxide-steam reaction. It is a further object of this invention to prepare iron oxide catalysts in tablet form of improved physical strength.

My invention involves the preparation of catalysts comprising iron oxide and containing chromium and alkali metal compounds in such amounts that there is present in the catalyst at least 1.5 gram atoms of chromium per gram atom of alkali metal which catalysts possess improved activity for the carbon monoxide-steam reaction, by a process involving the addition of chromic acid anhydride to furnish at least a part of the chromium content of the catalyst.

Catalysts may advantageously be prepared with this invention by mixing iron oxide with suitable amounts of an alkali metal compound and chromic acid anhydride to give a composition having the above ratio of chromium to alkali metal, and then tabletting the mixture thus prepared in any suitable manner; the presence of chromic acid anhydride in the catalyst tablets, I have discovered, leads to a greatly improved physical strength of the tablets as well as improving the efficiency of the catalyst. Magnesium oxide is preferably included in the catalyst composition prepared in accordance with my invention as this compound improves the tabletting characteristics of the catalyst mass.

The compositions of the catalysts prepared in accordance with my invention may vary widely within the limits above set forth. Thus, catalysts prepared in accordance with my invention may contain from about 15% to about 95% $Fe_2O_3$; the preferred iron oxide content is about 59.25%. The chromium content of the catalyst may vary from about 1% to about 80% chromium calculated as $CrO_3$; the preferred chromium content is about 10.5% calculated as $CrO_3$. An alkali metal content of from about 0.01% to about 2%, preferably about 0.25%, calculated as $K_2O$, may be used. However, when using the catalyst with carbon monoxide gases containing up to about 0.5% hydrogen sulfide, say from 0.05% to 0.5% (dry basis), which gases tend to destroy the activity of the catalyst by inducing sulfur poisoning, the initial alkali metal content of the catalyst should be within the limits of about 0.01% to about 0.75% calculated as $K_2O$; by so doing I have found the sensitivity of the catalyst to sulfur poisoning is substantially reduced. As pointed out above, the catalyst preferably contains magnesium oxide to improve its tabletting characteristics. The magnesium oxide content of the catalyst should be not more than about 84%; about 30% magnesium oxide is preferred.

Catalysts may be prepared in accordance with my invention by mixing dry iron oxide and dry magnesium oxide, and adding to the dry mixture an aqueous solution containing between about 0.1% and about 40% of an alkali metal dichromate, such as, for example, potassium or sodium dichromate, and between about 2% and about 70% chromic acid anhydride. The amount of water in which the alkali metal dichromate and the chromic acid anhydride added to the dry mixture of oxides is dissolved is important since too little water gives poor granulation and too much makes granulation difficult. About 30 parts of water per 100 parts of oxide mixture have been found to be suitable. The moist mixture thus obtained is then granulated and the granules dried. The dried granules are then tabletted in any suitable manner. Preferably the tabletting operation is carried out as described in Crittenden application Serial No. 412,927; i. e., the dry granules are mixed with a relatively small amount of a lubricant such as flake graphite, and the mixture then tabletted in an automatic tabletting machine. It should be mentioned that the tabletting pressure should not exceed that which will give tablets of satisfactory strength, since the activity of my catalysts decreases with increasing hardness of the tablets.

Used catalyst prepared in accordance with the method described in Crittenden Patent No. 2,197,707 may serve as a suitable raw material for the manufacture of the improved catalysts of my invention. A typical composition of such used catalyst is about 32% iron oxide, about 63% magnesium oxide, about 0.08% alkali metal calculated as $K_2O$, and about 1.8% chromium calculated as $CrO_3$, the balance of the catalyst consisting chiefly of silica, water and carbon dioxide. When preparing catalysts in accordance with my invention from such used catalysts, about 45 parts of the catalyst may be mixed with an approximately equal amount by weight of iron oxide, the mixture moistened with between about 16 and about 33 parts of an aqueous solution containing about 10 parts of chromic acid anhydride, and the moist mixture granulated, dried, and tabletted in the manner described above.

The catalysts prepared in accordance with my invention display improved activity in the production of hydrogen by the reaction of carbon monoxide and steam. The initial activity of my catalysts has been found in some cases to be as great as twice the initial activity of catalysts prepared in accordance with the Crittenden application. Furthermore, the rate of decline of the activity of my catalysts during use is much less than with former catalysts. The high activity of my improved catalysts may be illustrated by the fact that substantially lower temperatures may be employed when using my improved catalysts for the production of hydrogen than have been previously possible without affecting the degree of conversion of carbon monoxide and steam to carbon dioxide and hydrogen. Likewise, substantially higher rates of flow of carbon monoxide-steam mixture than heretofore used may be employed without substantially affecting the yield of hydrogen, thereby increasing the conversion capacity of converters.

Catalyst compacts or tablets prepared in accordance with this invention have been found to be of improved physical strength; what is even more surprising, the strength of the tablets does not decrease when first used, but in some cases may even increase during the initial period of use. This improved physical strength of tablets prepared from the catalysts of my invention permits converters to be operated over longer periods of time without the necessity of replacing the disintegrated tablets with a new charge.

The catalysts prepared in accordance with my invention are also insensitive to sulfur poisoning so that sulfur compounds normally present in the carbon monoxide-steam mixture need not be removed before passing the gases over the catalyst.

The following examples are illustrative of my invention. Amounts are given in parts by weight.

Example 1.—59.25 parts of dry iron oxide were mixed with 30 parts of dry calcined magnesite. Approximately 30 parts of an aqueous solution containing 0.75 part of potassium dichromate and 10 parts of chromic acid anhydride dissolved therein were added to the mixture, the moist mixture granulated and dried at a temperature of about 110° C. 0.3 part of flake graphite per 100 parts of the dry mixture was then thoroughly stirred into the mixture and the resultant mass tabletted in an automatic tabletting machine.

The tablets prepared in accordance with this example were tested to determine their physical strength. Twenty tablets prepared as described above and of ⅜ inch diameter were tested by adding weight in small increments onto the tablets until they were crushed. It was found that of twenty unused tablets two survived a crushing weight of 14 kgs.; the average crushing weight of the remainder was 9.4 kgs. After these tablets had been used for seventy days in a carbon monoxide-steam converter, it was found that out of twenty tablets eleven survived a crushing weight of 14 kgs., the average crushing weight of the remaining tablets being about 9 kgs. It will thus be seen that tablets prepared in accordance with the above example tended to increase in strength during the initial period of use. Furthermore, the activity of this catalyst after seventy days' use was substantially the same as its initial activity.

Example 2.—45 parts of used catalyst prepared in accordance with Crittenden Patent No. 2,197,707 the composition of which was about 32% iron oxide, about 63% magnesium oxide, about 0.08% alkali metal calculated as $K_2O$, and about 1.78% chromium calculated as $CrO_3$, were mixed with 45 parts of iron oxide, and the mixture wetted with about 31 parts of an aqueous solution containing 10 parts of chromic acid anhydride. The mixture was then granulated and dried at a temperature of about 110° C. About 0.3 part of flake graphite was then stirred into the dry mixture and the mixture tabletted in an automatic tabletting machine.

Twenty tablets prepared in accordance with this example were tested as described in Example 1. The average crushing strength of the tablets was such that all of the twenty tablets survived a crushing weight of 14 kgs. both before use and after use for seventy days in a carbon monoxide-steam converter. Furthermore, the activity of this catalyst after seventy days' use was substantially the same as its initial activity.

Example 3.—60 parts of dry iron oxide were mixed with 16.6 parts of dry calcined magnesite, and to the mixture was added an aqueous solution containing 0.75 part of potassium dichromate and 23.3 parts of chromic acid anhydride. The mixture was then granulated and dried at a temperature of about 110° C. About 0.3 part of flake graphite was then thoroughly stirred into the dry mixture and the mixture then tabletted.

While tablets prepared in accordance with this example did not show a physical strength as high as those prepared in accordance with the previous examples, the average weight under which twenty of the tablets were crushed being 4 kgs. initially and increasing to 5.5 kgs. after 135 days of use in a carbon monoxide-steam converter, the activity of this catalyst was extraordinarily high, the initial activity being approximately twice that of the tablets prepared in accordance with Example 2 and decreasing very little after 135 days' use.

Catalyst tablets prepared in accordance with Example 2 were charged into a carbon monoxide-stream converter. Two other converters were similarly charged with fresh catalyst and screened used catalyst of the Crittenden application, respectively. A mixture of carbon monoxide and steam was then passed through the three converters. In the converter containing the screened used catalyst, an average rate of flow of 1297 cu. ft./min. and an average temperature of 559° C. were used; the exit gas contained on the average 3.51% carbon monoxide, indicating a conversion of carbon monoxide and steam to carbon dioxide and hydrogen of about 94.75%. In the converter containing the fresh Crittenden catalyst, an average rate of flow of 1308 cu. ft./min. and an average temperature of 557° C. were employed; the exit gas contained on the average 3.39% carbon monoxide, indicating a conversion of about 94.92%. In the converter containing the catalyst manufactured in accordance with Example 2, the average rate of flow was 1579 cu. ft./min., substantially higher than in the other converters, and the average temperature was 542° C., substantially lower than in the other converters; the exit gas, however, contained on the average only 3.36% carbon monoxide, indicating a conversion of about 94.36%.

It will thus be seen that catalysts prepared in accordance with my invention, because of their increased activity and improved phyisical strength, represent a distinct improvement over catalysts heretofore used in the production of hydrogen by the reaction of carbon monoxide and steam.

Since certain changes in carrying out the above process may be made without departing from the scope of the invention, it is intended that all matter contained in the above description shall be interpreted as illustrative and not in a limiting sense.

I claim:

1. In the manufacture of catalysts adapted for use in the production of hydrogen by the reaction of carbon monoxide and steam and comprising iron oxide and containing chromium and alkali metal compounds, the improvement which comprises adding chromic acid anhydride to furnish at least a part of the chromium content of the catalyst, in such proportion that the finished catalyst will contain at least 1.5 gram atoms of chromium per gram atom of alkali metal.

2. A process for the manufacture of catalysts which comprises mixing iron oxide with an aqueous solution containing an alkali metal dichromate and chromic acid anhydride in proportions such that the finished catalyst will contain at least 1.5 gram atoms of chromium per gram atom of alkali metal, and preparing catalyst particles from the moist mixture.

3. A process for the manufacture of catalysts adapted for use in the production of hydrogen by the reaction of carbon monoxide and steam, which comprises mixing iron oxide and magnesium oxide, adding to the mixture an aqueous solution containing an alkali metal dichromate and chromic acid anhydride in proportions such that the finished catalyst will contain at least 1.5 gram atoms of chromium per gram atom of alkali metal, and preparing catalyst particles from the moist mixture.

4. A process for the manufacture of catalysts adapted for use in the production of hydrogen by the reaction of carbon monoxide and steam, which comprises mixing between about 15 and about 95 parts of iron oxide with not more than about 84 parts of magnesium oxide, adding to the mixture an aqueous solution containing between about 0.1% and about 40% of an alkali metal dichromate and between about 2% and about 70% of chromic acid anhydride in proportions such that the finished catalyst will contain at least 1.5 gram atoms of chromium per gram atom of potassium, granulating the mixture, drying the granulated mixture, adding thereto a relatively small amount of a lubricant, and tabletting the mixture.

VERNON MONROE STOWE.